March 9, 1937. W. A. BISHMAN 2,073,510
TIRE SPREADER
Filed March 26, 1936
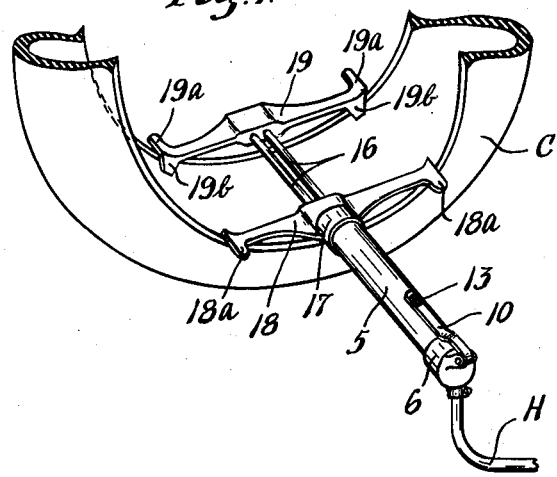
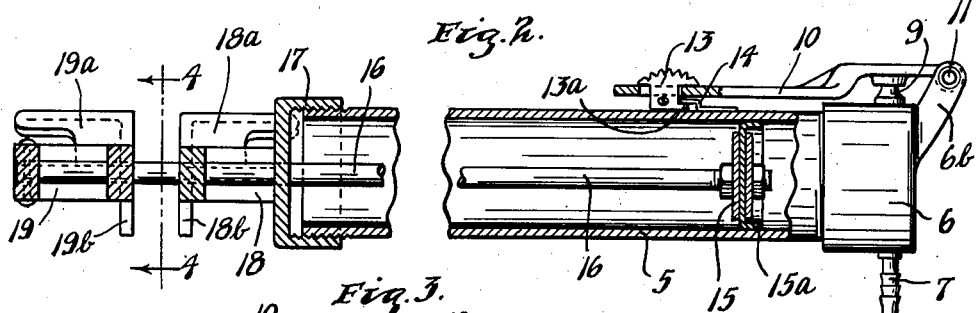
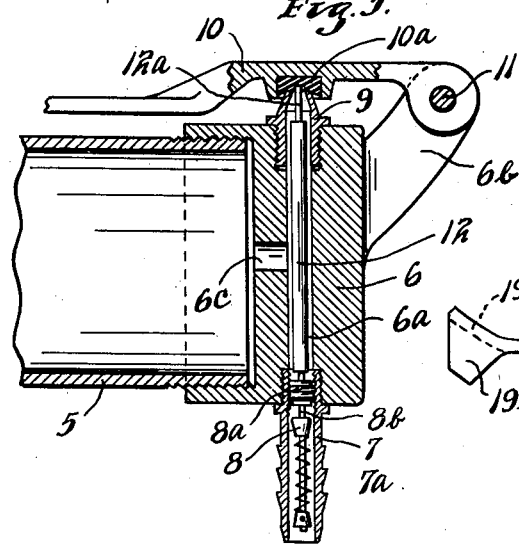
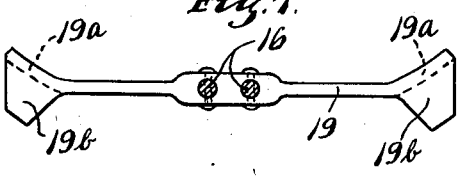
INVENTOR.
WALTER A. BISHMAN.
BY HIS ATTORNEYS.
Williamson & Williamson Patented Mar. 9, 1937

2,073,510

UNITED STATES PATENT OFFICE 2,073,510

TIRE SPREADER

Walter A. Bishman, Minneapolis, Minn., assignor to The Bishman Company, Minneapolis, Minn., a corporation of Minnesota Application March 26, 1936, Serial No. 71,016

6 Claims. (Cl. 152—27)

This invention relates to tire spreaders, and particularly to a light, portable construction which utilizes for its operating power any convenient source of air pressure such as is available in most filling stations, garages, etc.

It is an object of my invention to provide an extremely simple and highly efficient portable tire spreader which will quickly spread tire casings of all sizes, and which is readily accessible and operable at any place and at any level where a source of air pressure is available close at hand.

It is a further object to provide an air pressure actuated tire spreader wherein the housing, or cylinder, for the working parts is light and portable, and constitutes a handle for the device, and wherein a pair of cooperating spreading heads are employed, one of which is attached to the outer end of the cylinder, and the other of which is slidable outwardly from the first mentioned head.

Still a further object is the provision of a portable tire spreader of the type described, wherein compact valve operating means are included for simultaneously opening an air intake valve, and closing an air discharge valve, both of said valves being located on the air supply end of an actuating piston.

These and other objects and advantages of the invention will be more fully set forth in the following description made in connection with the accompanying drawing, in which like reference characters refer to similar parts throughout the several views, and in which:—

Fig. 1 is a prospective view showing an embodiment of my invention applied to spread a tire casing;

Fig. 2 is a view mostly in section taken longitudinally of my tire spreader;

Fig. 3 is a similar section taken on a somewhat larger scale, showing the construction of my valve mechanisms, and valve operating mechanism, and Fig. 4 is a detailed cross-section through the piston rods showing the outer spreading head of my device, in elevation.

In the form of my invention illustrated, an elongated cylinder 5 is provided closed at its rear end by means of a head or plug 6, which as shown has formed therein a diametrical passage 6—A extending through the peripheral wall of the plug. A tubular coupling member 7 constituting an air intake passage is internally screw-threaded into one end of the passage 6—A and carries a series of circumferentially extending external ribs 7—A which are adapted to retain an end of a flexible conduit, such as a rubber hose H. Within tubular coupling member 7 a conventional tire valve, indicated as an entirety by the numeral 8, is mounted, the plug member 8—A of said valve being screw-threaded within the inner and connected portion of the tubular member 7 and the valve being disposed in a position reversed to the usual position of such valves in automobile tires and with its stem 8—B disposed axially of tube 7 and accessible from the inner and connected end of said tube.

A tubular air discharge member 9 as shown is screw-threaded into head 6 at the end of the passage 6—A opposite to the air intake tube 7. The air discharge member 9 is tapered in its outer end terminating in a relatively small annular edge which forms a valve seat. The outer end of member 9 may be closed and sealed by engagement with a disc 10—A preferably constructed of compressible material, which disc is carried as shown in a shallow socket provided in an operating lever 10. Operating lever 10 is pivoted as shown by a pin 11 to a bracket or arm 6—B rigidly secured to or integrally formed within head 6, the valve or sealing disc 10—A being disposed a proper distance from the pin 11 to precisely align with the outer end of air discharge tube 9 when the lever is swung toward the cylinder 5. Lever 10 may be detachably held in inward or operating position by any suitable means, such as the thumb catch 13 which is slidably mounted in the other end of lever 10 and carries a retaining detent or lug 13—A adapted to engage beneath a small retaining plate 14 which is secured in proper position to the peripheral wall of cylinder 5 and which has an offset retaining end arranged to engage detent 13—A when the thumb catch is slid toward the pivoted end of the lever with the lever disposed in inward position adjacent to the cylinder. The valve operating member 12 as shown in the form of a rod is interposed between the inner end of the valve stem 8—B and the disc 10—A of operating lever 10 as shown, the disc engaging end of the rod 12 being materially reduced at 12—A to extend through the annular extremity of air discharge tube 9 and projecting beyond said extremity a sufficient distance to be engaged by the disc 10—A in the inward swinging of lever 10 for producing longitudinal movement of the rod 12 and, consequently, of the valve stem 8—B for the purpose of opening the valve 8 to admit compressed air. The cylinder head 6 is provided with an axial bore or passage 6—C communicating with the interior of cylinder 5.

Within cylinder 5 is mounted a suitable piston 15 as shown with the pump type having a pump lever 15—A clamped therein and said piston is provided with a pair of elongated piston rods 16 disposed in parallel side by side relation, which rods work through the cap 17, which as shown closes the forward end of the cylinder and is screw-threadedly connected therewith.

The heavy cap member 17 rigidly carries a spreading head 18 which as shown is integrally formed therewith and is of the shape shown best in Figures 1 and 4, being transversely disposed relatively to cylinder 5 and having arms arranged in the form of a T relatively to the cylinder, said arms being provided with upwardly curved extremities 18—A which afford on their undersurfaces abutments for engaging one of the edges of the flange of tire casing C, the points of engagement of said edge by the elements 18—A being spaced relatively widely apart. From the outer side of the spreading head 18 and adjacent to the two extremities thereof, I provide a pair of depending tire engaging lugs or plates 18—B, which as shown in Figure 1 are adapted to engage inwardly against the side of the tire casing flange.

The central portion of the spreading head 18 is thickened and is apertured to form a pair of spaced slide bearings for the two piston rods 16. A cooperating spreading head 19 is affixed to the outer ends of the rod 16 and is similar in shape and construction to the spreading head 18, being disposed in opposing relation thereto and having the upwardly curved parts 19—A and the depending casing engaging lugs 19—B, similar in construction and function to the parts 18—A and 18—B, respectively of the spreading head 18. Lugs 19—B, of course, engage the inner-side of the opposite edge of the tire casing C at spaced points and when the heads 18 and 19 are spread apart spread the casing widely, as clearly shown in Figure 1.

In operation the hose H is, of course, connected with a suitable source of compressed air and being flexible, the device may be carried by the cylinder 5 which constitutes a handle and may be readily moved to the location of the tire casing which it is desired to spread. The spreading elements in head 18 are then engaged with one of the edges of the casing, compressed air is turned on through the hose H, and when it is desired to extend the head 9, the spreading lever 10 is swung inwardly by hand pressure toward the cylinder 5, releasing the valve 8 and simultaneously closing the air-discharge passage 9 by sealing the edge of member 9 with disc 10—A. If it is desired to hold the casing spread for some time, the lever is secured in its inward swung position by engaging the thumb catch 13 with the retaining element 14, as shown in Fig. 2.

When it is desired to release the tire spreader, lever 10 is disconnected from locking engagement with retaining element 14 and compressed air entering tubular member 7 then is discharged through the discharge member 9, whereupon valve 8 by pressure of air and tension of its exhausted coil spring seats itself against the seat formed at the outer end of plug 8—A, shutting off further intake of compressed air. Compressed air in the cylinder 5 is exhausted through the air discharge member 9 and the movable head 19 by lateral pressure of the tire casing is returned to normal or retracted position.

From the foregoing description, it will be seen that I have provided a very light portable tire spreader which is pneumatically operated, and when supplied with adequate air pressure, is able to spread successfully and quickly the heaviest tire casings and which, further, may be easily lifted, using the cylinder as a handle, to any desired level, such as a table or bench, and thus is more readily accessible than the pneumatic tire spreaders now extensively utilized which are fixed to a floor or table.

It will, of course, be understood that various changes may be made in the form, details, proportions and arrangement of parts without departing from the scope of my invention.

What is claimed is:—

1. A portable tire spreader comprising a stationary spreading head, a movable spreading head, fluid pressure means, for operating said movable spreading head, a fluid inlet valve in said fluid pressure means, a fluid outlet valve therein, and a common control for said inlet and outlet valves.

2. A portable tire spreader comprising a stationary cylinder, a spreading head mounted thereon, pressure actuated means, a movable spreading head on said pressure actuated means, a fluid inlet valve and seat mounted on said cylinder, a fluid outlet valve and seat mounted in said cylinder, and common control means for operating said inlet and outlet valves in coordination.

3. A portable tire spreader comprising a stationary spreading head having means for engaging the top and side edges of a tire casing at spaced points, a co-operating spreading head of similar structure adapted to engage the opposite edges of a tire casing, a rod connected with said co-operating head and slidably engaging said stationary head, means for preventing rotational oscillation of said co-operating head, portable power actuated means connected with said stationary head and adapted to move said co-operating head outwardly away from said stationary head, and power control means mounted on said power actuated means.

4. A tire spreader having in combination a portable cylinder, a piston in said cylinder, a stationary spreading head secured to one end of said cylinder, a co-operating spreading head disposed in parallel relation outwardly of said stationary head, means on said spreading heads for engaging the tops and sides of the beads of a tire at spaced points, a piston rod connecting said co-operating head with said piston and being constructed to prevent rotational oscillation of said co-operating head, said cylinder having fluid intake and exhaust passages adjacent the end thereof opposite from said heads, and means mounted directly upon said cylinder for controlling the flow of fluid in said intake and exhaust passages.

5. A tire spreader having in combination a pair of co-operating spreading heads positioned in parallel arrangement, a cylinder, a piston in said cylinder, one of said spreading heads being connected with the outer end of said cylinder and the other of said spreading heads being secured to a movable element connecting said last mentioned spreading head with said piston, said movable element being mounted to prevent rotational movement of said last mentioned spreading head relative to said first mentioned spreading head, means upon said spreading heads for engaging the top and side edges of a tire casing, said cylinder having a fluid intake passage disposed at its inner end, said cylinder also having a fluid discharge passage disposed adjacent said intake passage, means mounted directly upon said cylinder for controlling the flow of fluid through said intake and discharge passages, and a conduit connected to said intake passage and adapted to be connected with a source of air under pressure.

6. A tire spreader having in combination a pair of co-operating spreading heads positioned in parallel arrangement, a cylinder, a piston in said cylinder, one of said spreading heads being connected rigidly with the outer end of said cylinder and the other of said spreading heads being secured to a movable element connecting said last mentioned spreading head with said piston, said movable element extending through a medial portion of said rigidly mounted spreading head and being held by said rigidly mounted spreading head to prevent relative rotational movement between said spreading heads, means upon said spreading heads for engaging the top and side edges of a tire casing, fluid intake and exhaust passages disposed in an end of said cylinder, and means mounted upon said cylinder for controlling the flow of fluid through said passages.

WALTER A. BISHMAN.